(12) United States Patent
Berendes et al.

(10) Patent No.: US 12,126,245 B2
(45) Date of Patent: Oct. 22, 2024

(54) CANNED MOTOR HAVING SEALED CONFIGURATION FOR A COOLANT

(71) Applicant: Dr. Ing. h.c. F. Porsche Aktiengesellschaft, Stuttgart (DE)

(72) Inventors: Philipp Berendes, Stuttgart (DE); Stefan Oechslen, Stuttgart (DE); Wieland Stock, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 239 days.

(21) Appl. No.: 17/830,383

(22) Filed: Jun. 2, 2022

(65) Prior Publication Data

US 2022/0393552 A1    Dec. 8, 2022

(30) Foreign Application Priority Data

Jun. 7, 2021 (DE) ..................... 10 2021 114 571.6

(51) Int. Cl.
 *H02K 9/19*     (2006.01)
 *H02K 9/197*    (2006.01)

(52) U.S. Cl.
 CPC .................................. *H02K 9/197* (2013.01)

(58) Field of Classification Search
 CPC ................................................... H02K 1/197
 USPC ............................................. 310/52, 54, 64
 See application file for complete search history.

(56) References Cited

U.S. PATENT DOCUMENTS

| | | | |
|---|---|---|---|
| 3,979,822 A | | 9/1976 | Halm |
| 5,975,538 A | * | 11/1999 | Krause ................... F16J 15/322 277/584 |
| 10,784,738 B2 | | 9/2020 | Berendes et al. |
| 2002/0195871 A1 | * | 12/2002 | Mohr .................... B60T 8/4022 303/115.4 |

(Continued)

FOREIGN PATENT DOCUMENTS

| | | |
|---|---|---|
| DE | 19534179 A1 | 3/1997 |
| DE | 102019112830 A1 | 11/2020 |

(Continued)

OTHER PUBLICATIONS

Kitada et al., English Machine Translation of JP2002165411 (Year: 2002).*

(Continued)

*Primary Examiner* — Rashad H Johnson
(74) *Attorney, Agent, or Firm* — LEYDIG, VOIT & MAYER, LTD.

(57) ABSTRACT

A canned motor, including: a motor housing, a stator fixed to the motor housing, a rotor mounted on the motor housing so as to be rotatable relative to the stator about an axis of rotation, a can fixed to the stator radially between the stator and the rotor, at least one annular seal carrier fixed to the motor housing, radially inside the can, at an axial stator end, and at least one annular seal supported radially and axially on the seal carrier, the at least one annular seal configured to seal off a rotor space, in which the rotor is arranged, from a stator space through which a coolant can flow, wherein the stator space has a main region and an annular region, which extends from the at least one annular seal along the seal carrier and merges into the main region at a distance from the seal.

16 Claims, 4 Drawing Sheets

(56) References Cited

U.S. PATENT DOCUMENTS

| | | | |
|---|---|---|---|
| 2005/0001388 A1 | 1/2005 | Travers | |
| 2013/0038151 A1* | 2/2013 | Ohashi | H02K 7/086 310/59 |
| 2013/0058812 A1* | 3/2013 | Kim | F04D 13/027 417/420 |
| 2013/0058813 A1* | 3/2013 | Kim | F04D 13/027 417/420 |
| 2015/0211525 A1 | 7/2015 | Damm et al. | |
| 2018/0226855 A1* | 8/2018 | Berendes | H02K 3/34 |
| 2021/0218316 A1* | 7/2021 | Ness | H02K 5/203 |
| 2022/0052576 A1* | 2/2022 | Knoblauch | H02K 5/128 |
| 2022/0278579 A1* | 9/2022 | Bossecker | H02K 11/33 |
| 2022/0393552 A1* | 12/2022 | Berendes | H02K 9/197 |
| 2023/0037848 A1* | 2/2023 | Taguchi | H02K 5/1737 |
| 2023/0307988 A1* | 9/2023 | Reimnitz | H02K 7/083 |
| 2024/0022138 A1* | 1/2024 | Knoblauch | H02K 5/203 |

FOREIGN PATENT DOCUMENTS

| | | |
|---|---|---|
| DE | 102019117373 A1 | 12/2020 |
| DE | 102019120824 A1 | 2/2021 |
| EP | 3611828 A1 | 2/2020 |
| JP | H11078851 A | 3/1999 |
| JP | 2002013644 A | 1/2002 |
| JP | 2002165411 A | 6/2002 |
| JP | 2007292706 A | 11/2007 |
| JP | 2010213412 A | 9/2010 |
| JP | 2011193572 A | 9/2011 |
| JP | 2018126052 A | 8/2018 |
| WO | WO 2013092902 A1 | 6/2013 |

OTHER PUBLICATIONS

Tanaka et al., English Machine Translation of JP2002013644 (Year: 2002).*

\* cited by examiner

CANNED MOTOR HAVING SEALED CONFIGURATION FOR A COOLANT

CROSS REFERENCE TO RELATED APPLICATIONS

This application claims benefit to German Patent Application No. DE 10 2021 114 571.6, filed on Jun. 7, 2021, which is hereby incorporated by reference herein.

BACKGROUND

A canned motor is an electric motor in which the rotor and stator are separated by a can. The can is situated in an air gap between the stator and the rotor of the motor and is generally arranged in a fixed manner on the stator. The can makes it possible to seal the rotating parts with respect to the stationary parts and the environment. A canned motor is used particularly when the stator is to be cooled inside the motor housing with a liquid coolant.

A canned motor of the type in question is known from EP 3 611 828 A1, for example. Such a canned motor of the type in question has a motor housing, a stator arranged in a fixed manner on the motor housing, a rotor mounted on the motor housing so as to be rotatable relative to the stator about an axis of rotation, and a can arranged radially between the stator and the rotor. Furthermore, such a canned motor is equipped with at least one annular seal carrier arranged in a fixed manner on the motor housing, radially inside the can, in the region of an axial stator end, and with at least one annular seal, which is supported radially and axially on the seal carrier, for sealing off a rotor space, in which the rotor is arranged, from a stator space, through which a coolant can flow.

In the canned motor known from the abovementioned EP 3 611 828 A1, the respective seal is supported on the respective seal carrier radially on the inside and axially on both sides, while, radially on the outside, it has an outer contour which is curved convexly toward the can and by which it rests directly on the can.

It has been found that the sealing between the rotor space and the stator space with such a seal requires relatively narrow tolerance fields in the tolerance chain of the stator inner surface, stator back, housing, cover and seal carrier, and, furthermore, additional measures may be necessary, such as complex mechanical machining of the seal partners.

A similar canned motor is known from WO 2013/092902 A1. There, the seal has a holding section which engages positively in an annular groove. This annular groove is formed on a retaining ring, which is inserted into the can and is held on a bearing plate.

Other canned motors are known from DE 10 2019 112 830 A1 and from DE 10 2019 117 373 A1. In the case of these canned motors, the end of the can is inserted into a complex seal, with the result that the seal rests directly against the canned motor radially on both sides and axially.

U.S. Pat. No. 3,979,822 A discloses a further canned motor with a seal, in which, however, there is no flow of coolant through the rotor space. The respective seal is supported only radially on the respective seal carrier and has an X-shaped profile.

SUMMARY

In an embodiment, the present disclosure provides a canned motor, comprising: a motor housing, a stator fixed to the motor housing, a rotor mounted on the motor housing so as to be rotatable relative to the stator about an axis of rotation, a can fixed to the stator radially between the stator and the rotor, at least one annular seal carrier fixed to the motor housing, radially inside the can, at an axial stator end, and at least one annular seal supported radially and axially on the seal carrier, the at least one annular seal configured to seal off a rotor space, in which the rotor is arranged, from a stator space through which a coolant can flow, wherein the stator space has a main region, which is axially adjacent to the stator, and an annular region, which extends from the at least one annular seal along the seal carrier and merges into the main region at a distance from the seal, and wherein the seal has an annular main body and a circumferential sealing lip which projects radially outward from the main body and axially toward the annular region.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

The present disclosure provides an improved a canned motor of the type in question which is distinguished, in particular, by an improved sealing effect, combined with a relatively high compatibility with production tolerances, and reduced production costs.

Embodiments of the invention are based on the general concept of arranging the stator, motor housing, can and seal carrier in the region of the respective axial stator end in such a way that the stator space extends up to the seal carrier and along the seal carrier up to the seal, with the result that the pressure prevailing in the stator space, which corresponds to the coolant pressure when coolant flows through it, acts on the seal. For this purpose, the stator space has a main region, which is axially adjacent to the stator, and an annular region, which extends from the seal along the seal carrier and merges into the main region at a distance from the seal. For this purpose, the can ends at an axial distance from the motor housing or from a cover which axially closes the motor housing at this axial end. Furthermore, according to an embodiment of the invention, the seal is provided with an annular main body and a circumferential sealing lip, which projects radially outward from the main body and axially toward the annular region. The sealing lip is thus situated on a front side, facing the annular region, of the seal, which is therefore exposed to the pressure in the stator space or the coolant and the coolant pressure during operation of the canned motor. The orientation of the sealing lip proposed according to an embodiment of the invention, with which it projects from the main body, ensures that the sealing lip is pressed radially outward to a greater extent with increasing pressure in the stator space or in the coolant and accordingly comes to rest against the respective sealing partner with an increasing preload. Thus, the sealing effect of the seal increases with increasing pressure in the stator space or in the coolant. It is thereby possible to achieve a significant improvement in the sealing effect. Moreover, the sealing lip projecting from the main body is elongate in the cross-sectional profile of the seal and, in addition, flexible, thus enabling it to compensate for comparatively large production tolerances. This compatibility with relatively large tolerances reduces the outlay on production and thus the production costs.

The indications "axial" and "radial" refer to the axial direction and the radial direction. In the present context, the axial direction, the radial direction, and the circumferential direction are defined by the axis of rotation. The axial direction is parallel to the axis of rotation. The radial direction is perpendicular to the axial direction and, in particular, is perpendicular to the axis of rotation. The circumferential direction runs around the axis of rotation.

According to an advantageous embodiment, the seal can have, on a front side facing the annular region, a circumferential supporting section, which is supported radially on the seal carrier. With the aid of this supporting section, a defined front seal region of the seal with respect to the seal carrier is created, wherein this supporting section is likewise exposed on the front side of the seal to the pressure in the stator space or in the coolant, and therefore the contact pressure of the supporting section on the seal carrier increases with increasing pressure.

A development in which the sealing lip projects axially beyond the supporting section is advantageous. This ensures that the sealing lip is of larger dimensions, at least in the axial direction, than the supporting section and accordingly has greater flexibility and mobility than the supporting section. Thus, the tolerance compensation is accomplished mainly via the elastically deformable sealing lip.

An advantageous embodiment proposes that the seal has, on the front side, a circumferential recess, which is arranged radially between the supporting section and the sealing lip. This recess ensures that the pressure in the stator space or in the coolant on the sealing lip and on the supporting section intensifies a radially acting component. In this way, the radial contact pressure of the sealing lip on the respective sealing partner and of the supporting section on the seal carrier is intensified. In addition, the axial dimension of the sealing lip is increased by the recess, which improves tolerance compatibility.

According to an embodiment, the seal carrier can have a circumferential annular groove, which is delimited radially by a groove bottom and axially by two mutually opposite groove walls. In this case, one groove wall is arranged axially closer to the annular region and faces away from the latter, while the other groove wall is arranged axially further away from the annular region and faces the latter. An embodiment in which the seal is inserted into the annular groove and is supported radially on the groove bottom and axially on at least one groove wall, that is to say on only one groove wall or on both groove walls, is particularly expedient. In this way, on the one hand, the secure positioning of the seal on the seal carrier is simplified, while, on the other hand, an efficient sealing effect is achieved between the seal and the seal carrier.

In an embodiment, the seal has, on a rear side facing away from the annular region, a sealing surface, which is formed on the main body and is supported in a planar manner and axially on the groove wall facing the annular region. On the one hand, the planar support ensures an efficient sealing effect between the seal and the seal carrier at said groove wall. On the other hand, the seal is pressed axially against this groove wall by the pressure in the stator space or in the coolant, thereby increasing the contact pressure of the sealing surface on this groove wall and accordingly improving the sealing effect.

In an embodiment, the seal is provided with a rear projection, which is formed proximally with respect to the rear side, that is to say in the vicinity of the rear side, on the main body, and with a front projection, which is formed distally with respect to the rear side, that is to say at a distance from the rear side, on the main body. The seal is now supported radially on the groove bottom by means of this rear projection and this front projection. Defined, axially limited, in particular linear, contact zones between the seal and the seal carrier in the groove bottom are achieved by means of these projections, improving the sealing effect. In particular, the front projection can be formed on the supporting section which may be present.

A development in which the seal is curved concavely toward the groove bottom on an inner side facing the groove bottom between the rear projection and the front projection is particularly advantageous. In this case, the curvature is expediently selected in such a way that the seal is supported radially on the groove bottom only via the rear projection and the front projection. This curvature thus assists the separate and defined contact pressure of the seal against the groove bottom via the projections.

According to an advantageous development, provision can be made for a gap to be formed in the annular groove axially between the seal and the groove wall facing away from the annular space. This axial gap ensures that the entire front side of the seal is exposed to the pressure in the stator space or in the coolant, improving the pressure-dependent sealing effect of the seal.

In an embodiment, the seal has a plurality of anti-tilt devices, which are formed on the main body on a radial outer side of the seal in a manner distributed in the circumferential direction. These anti-tilt devices effect dimensional stabilization of the seal outside the sealing lip in order to avoid unwanted deformation of the seal on its rear side even at relatively high pressures in the stator space or in the coolant. Such anti-tilt devices can be formed by thickened portions of material, for example.

The seal is preferably an injection-molded body on which all the components of the seal are expediently integrally formed. Thus, at least the main body and the sealing lip are integrally formed on the seal. In particular, the supporting section and/or the rear projection and/or the front projection and/or the anti-tilt devices can also be integrally formed on the seal.

Depending on the design of the canned motor, the sealing lip can interact with different sealing partners. Expediently, the sealing lip can be supported radially directly on the can. In an embodiment, the sealing lip can be supported radially directly on a liner, which can consist of a plastic, for example. This liner can form the can. It is likewise conceivable for the liner to be attached to a radial inner side of the can.

It is likewise conceivable for the sealing lip to be supported radially directly on a supporting ring, which is fixed on the stator at the respective axial stator end. The can or the abovementioned liner can be supported radially on this supporting ring. This supporting ring can be supported radially and axially at the respective axial stator end on an annular step formed on the stator end. The supporting ring can furthermore be supported radially on an end plate, which is attached axially to the respective axial stator end. As an option, it is additionally possible to provide a retaining ring, which is supported axially and radially in an annular step formed on the end plate and on which the supporting ring is radially supported.

It is self-evident that the features mentioned above and those that will be explained below can be used not only in the respectively specified combination but also in other combinations or on their own without departing from the scope of the invention. The abovementioned and yet to be mentioned constituents of a higher-level unit, such as, for example, a device, an apparatus or an assembly, which are designated separately, can form separate component parts or components of this unit or can be integral regions or sections of this unit, even if this is illustrated in a different way in the drawings.

Preferred exemplary embodiments of the invention are illustrated in the drawings and are explained in greater detail in the following description, wherein identical reference signs refer to identical or similar or functionally identical components.

Figure 1:
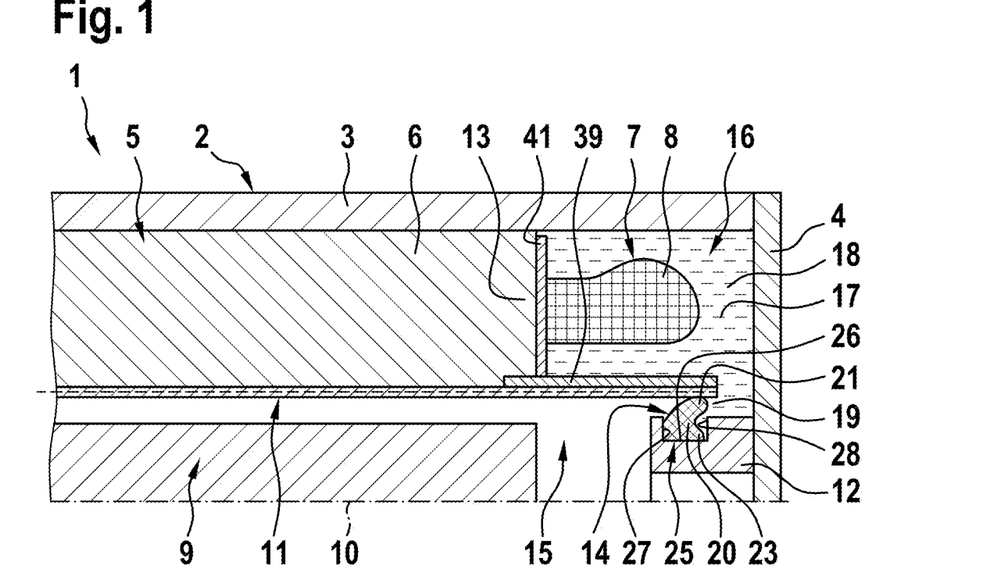
FIG. 1 shows a greatly simplified sectional view of a canned motor in the region of an axial stator end.

According to FIG. 1, a canned motor 1 comprises a motor housing 2, which has a cylindrical casing 3 and at least one cover 4 for closing the casing 3 at an axial casing or motor end. The canned motor 1 also has a stator 5, which is arranged in a fixed manner on the motor housing 2. The stator 5 expediently has a laminated core 6 and a winding 7 with winding overhangs 8 which project from the laminated core 6 at end faces of the laminated core 6.

The canned motor 1 is furthermore equipped with a rotor 9, which is mounted on the motor housing 2 so as to be rotatable relative to the stator 5 about an axis of rotation 10. Corresponding bearing locations are omitted here for the sake of simplicity. The axis of rotation 10 defines the axial direction and the radial direction for all the components of the canned motor 1. The canned motor 1 furthermore has a can 11, which is arranged radially between the stator 5 and the rotor 9 and in a fixed manner on the stator 5. Mounted on the motor housing 2, here on the cover 4, is an annular seal carrier 12, which for this purpose is arranged radially inside the can 11 in the region of an axial stator end 13. FIG. 1 shows only one axial stator end, in this case the right-hand stator end 13. Such a seal carrier 12 is provided at least in the region of this one stator end 13. Depending on the design of the canned motor 1, a further seal carrier 12 can also be provided in the region of the other axial stator end. Likewise conceivable is a canned motor 1 which has only one such seal carrier 12. In all cases, the canned motor 1 is equipped with at least one annular seal 14, which is supported radially and axially on the seal carrier 12. The seal 14 serves to separate or seal off a rotor space 15, in which the rotor 9 is situated, from a stator space 16, through which a coolant 17 can flow. A corresponding inlet and an associated outlet for the coolant 17 are omitted here for the sake of simplicity. At least one section of the stator 5, in this case the winding overhangs 8, is situated in the stator space 16, allowing said winding overhangs to come into direct contact with the coolant 17 in order to dissipate heat there.

The motor housing 2, the stator 5, the can 11 and the seal carrier 12 are matched to one another and arranged relative to one another in such a way that the stator space 16 has a main region 18 and an annular region 19. The main region 18 is axially adjacent to the stator 5. The annular region 19 extends from the seal 14 along the seal carrier 12 and merges into the main region 18 at a distance from the seal 14. In this case, the annular region 19 merges into the main region 18 axially between the can 11 and the housing 2. For this purpose, the can 11 ends at an axial distance from the motor housing 2 or from the cover 4.

According to FIGS. 1 to 8, the seal 14 has an annular main body 20 and a circumferential sealing lip 21, wherein the sealing lip 21 projects radially outward from the main body 20 and axially toward the annular region 19. The sealing lip 21 is of elongate configuration in the profile of the seal 14. The seal 14 optionally has a circumferential supporting section 23 on a front side 22 facing the annular region 19. By means of this supporting section 23, the seal 14 is supported radially on the inside on the seal carrier 12. In the embodiments shown here, the sealing lip 21 projects axially beyond this supporting section 23, as a result of which the sealing lip 21 has greater flexibility than the supporting section 23. The seal 20 can optionally have a circumferential recess 24 on the front side 22. In this case, the recess 24 is arranged radially between the supporting section 23 and the sealing lip 21 and increases the flexibility of the sealing lip 21 and of the supporting section 23.

According to FIGS. 1 to 9, the seal carrier 12 has a circumferential annular groove 25 to accommodate the seal 14. The annular groove 25 is delimited radially by a groove bottom 26 and axially by two mutually opposite groove walls 27, 28. The seal 14 is inserted into the annular groove 25 in such a way that it is supported radially on the groove bottom 26 and axially on one of the groove walls 27. According to FIGS. 1, 2 and 5 to 8, the seal 14 has, on a rear side 29 facing away from the annular region 19, a sealing surface 30 which is formed on the main body 20 and extends radially and in the circumferential direction 38 indicated by a double arrow in FIG. 4. The sealing surface 30 rests in a planar manner against the groove wall 27 facing the annular region 19, thereby providing planar axial support. The seal 14 can furthermore optionally have a rear projection 31, which is formed proximally with respect to the rear side 29 on the main body 20, and a front projection 32, which is formed distally with respect to the rear side 29 on the main body 20, in this case on the supporting section 23. By means of these projections 31, 32, the seal 14 is supported radially on the groove bottom 26. Furthermore, here the seal 14 is provided on an inner side 33 facing the groove bottom 26 with a curvature 34 which is concave toward the groove bottom 26 and extends from the rear projection 31 to the front projection 32. As a result, the seal 14 rests against the groove bottom 26 exclusively via the projections 31, 32. The seal 14 is expediently of axially smaller dimensions than the annular groove 25 in the region of the supporting section 23. Since the seal 14 normally rests against the groove wall 27 facing the annular region 19, a gap 35 is formed axially between the seal 14 and the groove wall 28 which faces away from the annular region 19 by virtue of the selected dimensioning. As a result, the entire front side 22 of the seal 14 is exposed to the pressure in the annular region 19 and therefore to the pressure in the stator space 16 or the coolant 17.

Figure 4:
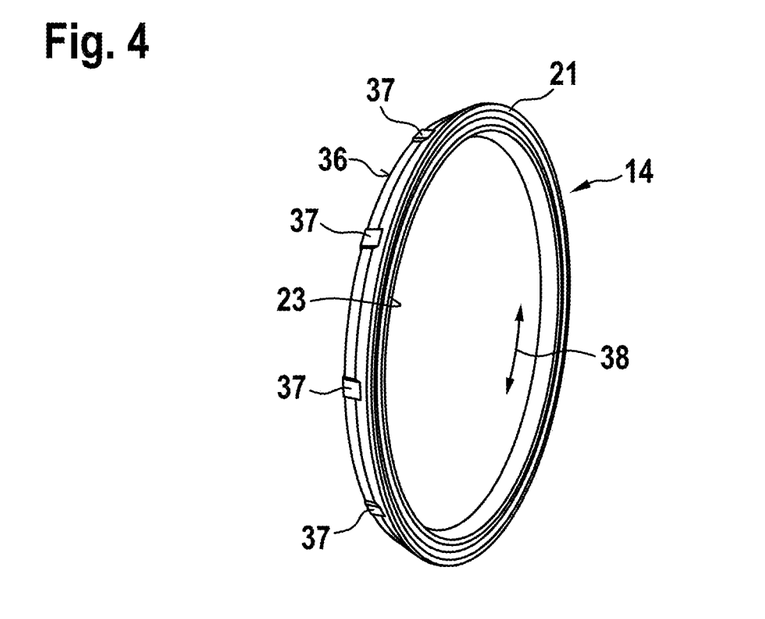
FIG. 4 shows an isometric view of the seal.

According to FIG. 4, the seal 14 can have, on its radial outer side 36, a plurality of anti-tilt devices 37, which are formed on the main body 20 in a manner distributed, preferably uniformly distributed, in the circumferential direction 38. The anti-tilt devices 37 stabilize the shape of the seal 14 on its outer side 36. By means of the anti-tilt devices 37, tilting of the seal 14, that is to say rotation of the seal 14 about a longitudinal direction of the profile, which runs in the circumferential direction and through the cross-sectional profile, can be prevented.

Figure 2:
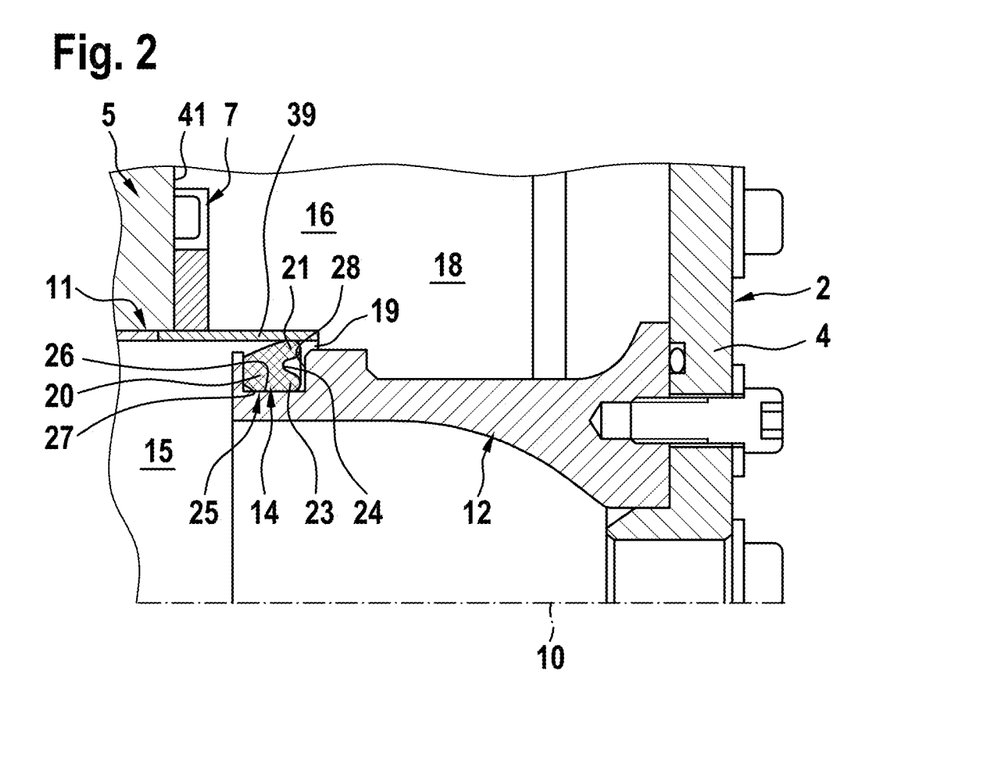
FIG. 2 shows a view as in FIG. 1 in the region of a seal carrier with a seal.
Figure 3:
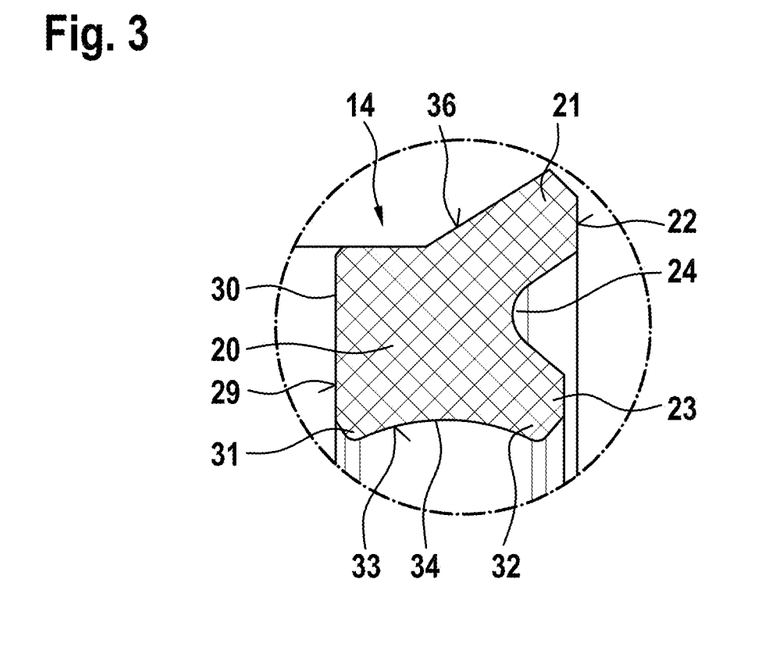
FIG. 3 shows an enlarged cross section of the seal.
Figure 5:
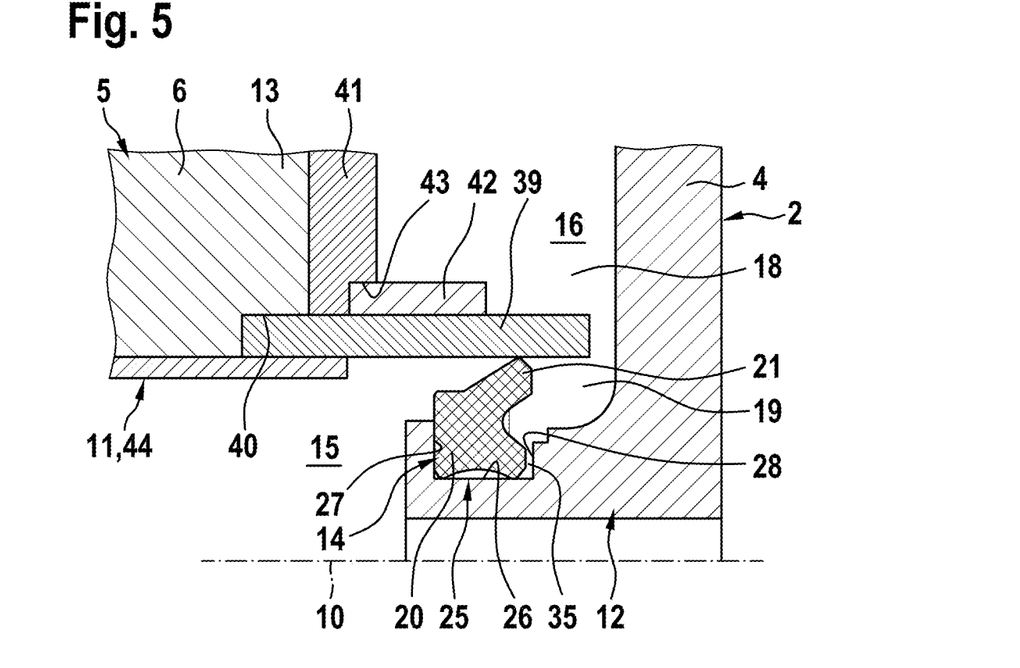
FIGS. 5 to 8 show views of various embodiments of a seal.
Figure 7:
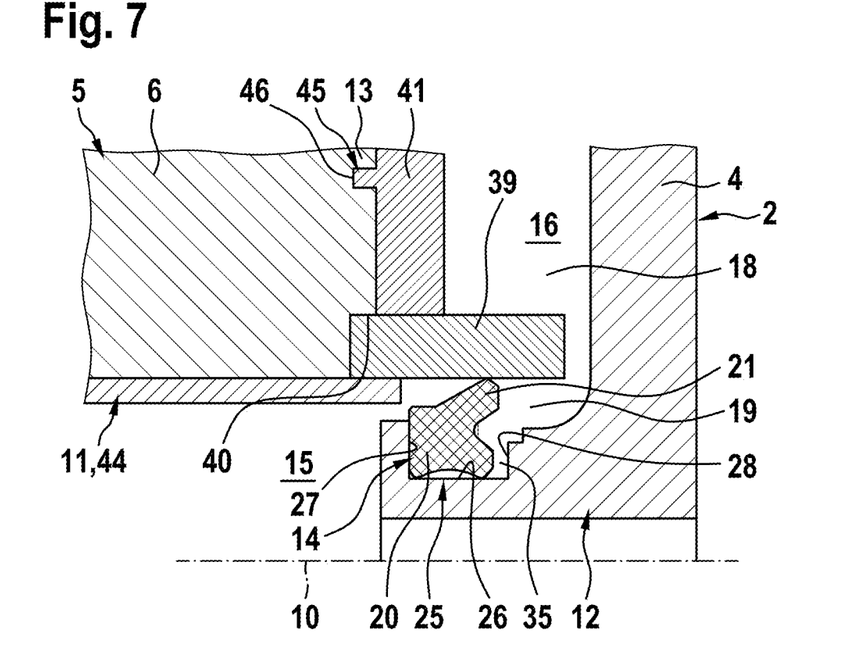
Figure 8:
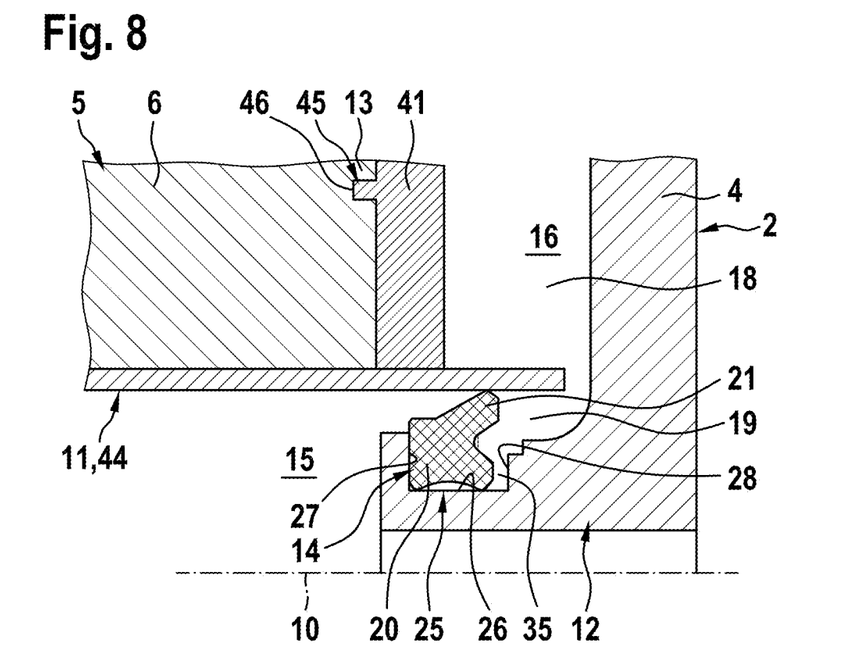

According to the examples in FIGS. 1, 2 and 8, the sealing lip 21 can be supported radially directly on the can 11. In the examples of FIGS. 5 and 7, on the other hand, provision is made for the sealing lip 21 to be supported radially directly on a supporting ring 39, which is fixed on the respective axial stator end 13. The can 11 can be supported radially on this supporting ring 39, for example. In order to fix, hold or support the supporting ring 39, the stator 5 or the laminated core 6 thereof can be provided in the region of the respective axial stator end 13 with an annular step 40, in which the supporting ring 39 is supported axially and radially on the stator 5. The stator 5 can furthermore carry an end plate 41 on the respective axial stator end 13, in order to stabilize the laminated core 6 for example. The supporting ring 39 can also be supported radially on this end plate 41. In the example of FIG. 5, a retaining ring 42 is furthermore provided, which is supported radially on the end plate 41 and on which the supporting ring 39 is supported radially. According to FIG. 5, an annular step 43, in which the retaining ring 42 is radially and axially supported on the end plate 41, can be formed on the end plate 41 to support the retaining ring 42.

Figure 6:
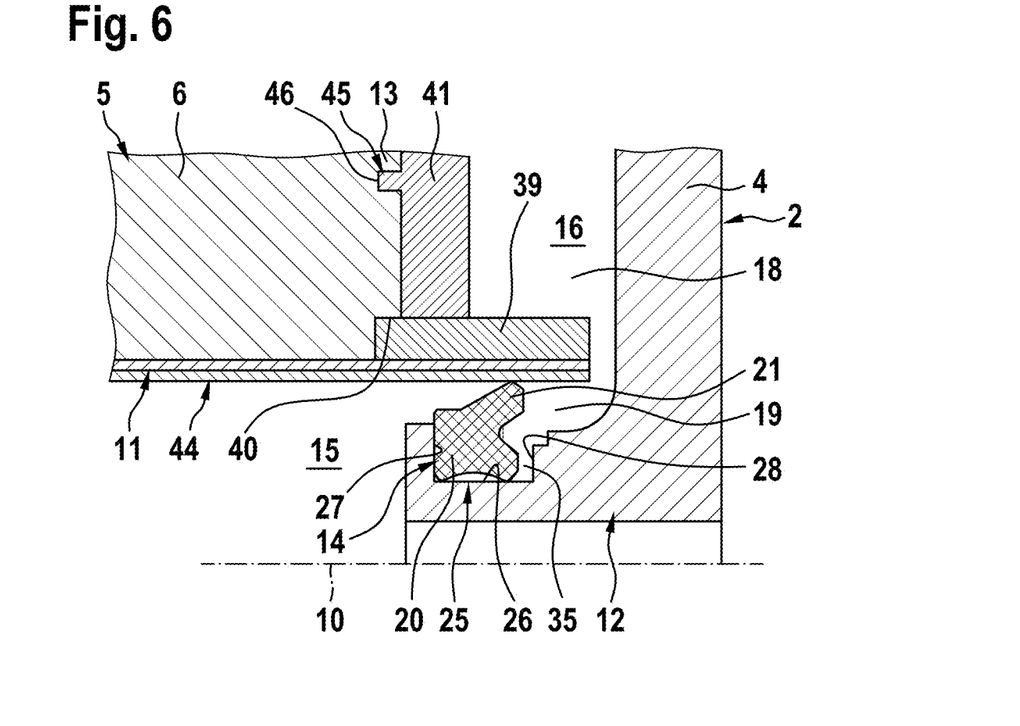

The can 11 can be configured as a liner 44, it being possible for the liner 44 to be formed from a plastic, for example, preferably from a reinforced plastic, and in particular from a glass fiber-reinforced plastic. As an alternative to this, it is likewise possible to provide such a liner 44 in addition to the can 11, the liner 44 then being arranged on or attached to the radial inner side of the can 11. According to FIGS. 6 and 8, the sealing lip 21 can be supported radially directly on this liner 44. FIG. 6 shows, as a representative example, a variant in which the liner 44 is of two-ply design.

To secure and position the end plate 41 radially, at least one latching lug 45 can be provided, which is arranged in a fixed manner on the end plate 41 and which engages axially in a latching socket 46 complementary thereto. The latching lug 45 can be designed as a circumferential ring. The latching socket 46 can then be designed as a circumferential annular groove. It is likewise conceivable to arrange a plurality of latching lugs 45, arranged in a manner distributed in the circumferential direction 38, in a fixed manner on the end plate 41, said latching lugs then engaging axially in a latching socket 46 designed as an annular groove or in a corresponding number of separate latching sockets 46 arranged in a manner distributed in the circumferential direction 38.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A canned motor, comprising:
   a motor housing;
   a stator fixed on the motor housing;
   a rotor mounted on the motor housing so as to be rotatable relative to the stator about an axis of rotation;
   a can fixed on the stator radially between the stator and the rotor;
   at least one annular seal carrier fixed on the motor housing, radially inside the can, in a region of an axial stator end; and
   at least one annular seal supported radially and axially on the seal carrier, the at least one annular seal configured to seal off a rotor space, in which the rotor is arranged, from a stator space through which a coolant can flow,
   wherein the stator space has a main region, which is axially adjacent to the stator, and an annular region, which extends from the at least one annular seal along the seal carrier and merges into the main region at a distance from the seal, and
   wherein the seal has an annular main body and a circumferential sealing lip which projects radially outward from the main body and axially toward the annular region.

2. The canned motor as claimed in claim 1, wherein the seal has, on a front side facing the annular region, a circumferential supporting section supported radially on the seal carrier.

3. The canned motor as claimed in claim 2, wherein the sealing lip projects axially beyond the supporting section.

4. The canned motor as claimed in claim 2, wherein the seal has, on the front side, a circumferential recess arranged radially between the supporting section and the sealing lip.

5. The canned motor as claimed in claim 1, wherein the seal has a plurality of anti-tilt devices formed on the main body on a radial outer side of the seal, the plurality of anti-tilt devices being distributed about the seal in a circumferential direction of the seal.

6. The canned motor as claimed in claim 1, wherein the sealing lip is supported radially on the can.

7. The canned motor as claimed in claim 1, wherein the sealing lip is supported radially on a liner that forms the can or is attached to a radial inner side of the can.

8. The canned motor as claimed in claim 1, wherein the sealing lip is supported radially on a supporting ring that is fixed to the stator at the axial stator end, and wherein the can or a liner is radially supported on the supporting ring.

9. The canned motor as claimed in claim 8, wherein the liner forms the can or is attached to a radial inner side of the can.

10. The canned motor as claimed in claim 1, wherein the circumferential sealing lip further projects axially into the annular region.

11. The canned motor as claimed in claim 10, wherein the annular region further extends along a radial inner side of the can, a circumferential supporting section supported radially on the seal carrier, or a liner that forms the can.

12. The canned motor as claimed in claim 1, wherein the annular region further extends along a radial inner side of the can, a circumferential supporting section supported radially on the seal carrier, or a liner that forms the can.

13. A canned motor, comprising:
a motor housing;
a stator fixed on the motor housing;
a rotor mounted on the motor housing so as to be rotatable relative to the stator about an axis of rotation;
a can fixed on the stator radially between the stator and the rotor;
at least one annular seal carrier fixed on the motor housing, radially inside the can, in a region of an axial stator end; and
at least one annular seal supported radially and axially on the seal carrier, the at least one annular seal configured to seal off a rotor space, in which the rotor is arranged, from a stator space through which a coolant can flow,
wherein the stator space has a main region, which is axially adjacent to the stator, and an annular region, which extends from the at least one annular seal along the seal carrier and merges into the main region at a distance from the seal,
wherein the seal has an annular main body and a circumferential sealing lip which projects radially outward from the main body and axially toward the annular region, and
wherein the seal carrier has a circumferential annular groove delimited radially by a groove bottom and delimited axially by two mutually opposite groove walls, wherein the seal is configured to be inserted into the annular groove, supported radially on the groove bottom, and supported axially on at least one groove wall.

14. The canned motor as claimed in claim 13, wherein the seal has, on a rear side facing away from the annular region, a sealing surface formed on the main body and supported in a planar manner and axially on the groove wall facing the annular region.

15. The canned motor as claimed in claim 13, wherein the seal is supported radially on the groove bottom by a rear projection formed proximally to the rear side on the main body and the seal is supported radially by a front projection formed distally to the rear side on the main body, and wherein the seal is curved concavely toward the groove bottom on an inner side facing the groove bottom between the rear projection and the front projection.

16. The canned motor as claimed in claim 13, comprising a gap formed in the annular groove axially between the seal and the groove wall facing away from the annular region.

* * * * *